United States Patent
Thakkar et al.

(10) Patent No.: US 11,301,242 B2
(45) Date of Patent: Apr. 12, 2022

(54) FEATURE-BASED REPORTING OF SOFTWARE VERSIONS

(71) Applicant: HEWLETT PACKARD ENTERPRISE DEVELOPMENT LP, Houston, TX (US)

(72) Inventors: Sanchal Thakkar, Bangalore (IN); Yashavantha Nagaraju Naguvanahalli, Bangalore (IN); Ashmitha Jiv Shetty, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 107 days.

(21) Appl. No.: 16/795,161

(22) Filed: Feb. 19, 2020

(65) Prior Publication Data

US 2020/0264868 A1 Aug. 20, 2020

(30) Foreign Application Priority Data

Feb. 20, 2019 (IN) .............................. 201941006775

(51) Int. Cl.
*G06F 9/44* (2018.01)
*G06F 11/36* (2006.01)
(Continued)

(52) U.S. Cl.
CPC .................. *G06F 8/71* (2013.01); *G06F 8/73* (2013.01); *G06F 8/77* (2013.01); *G06F 11/3616* (2013.01);
(Continued)

(58) Field of Classification Search
CPC ..... G06F 8/71; G06F 8/73; G06F 8/77; G06F 8/65; G06F 8/656; G06F 8/70;
(Continued)

(56) References Cited

U.S. PATENT DOCUMENTS 5,586,304 A * 12/1996 Stupek, Jr ............... G06F 8/658
717/170
8,219,514 B2 * 7/2012 Caldwell ................ G06N 5/022
706/47
(Continued)

OTHER PUBLICATIONS

Boyce Sigweni et al., Feature Weighting for Case-Based Reasoning Software Project Effort Estimation, May 13-14, 2014, [ Retrieved on Nov. 15, 2021], Retrieved from the internet: <URL: https://dl.acm.org/doi/pdf/10.1145/2601248.2613081> 4 Pages (1-4) (Year: 2014).*

(Continued)

*Primary Examiner* — Anibal Rivera
(74) *Attorney, Agent, or Firm* — Hewlett Packard Enterprise Patent Department

(57) ABSTRACT

Aspects of feature-based reporting of software versions are described. A set of features of a software configured on a computing device is ascertained. A first database is queried, based on a current version of the software installed on the computing device and the set of features, to obtain a list of relevant defects addressed for each feature in later versions of the software. A second database is queried, based on the current version of the software and the set of features, to obtain a list of relevant enhancements provided for each feature of the set of features in the later versions. A report is generated based on responses received from the first and second database. The report comprises, for each feature, a summary of the list of relevant defects addressed and the list of relevant enhancements provided in each later version.

15 Claims, 5 Drawing Sheets

(51) Int. Cl.
| | |
|---|---|
| *G06F 9/445* | (2018.01) |
| *G06F 8/71* | (2018.01) |
| *G06F 16/903* | (2019.01) |
| *G06F 40/284* | (2020.01) |
| *G06F 8/73* | (2018.01) |
| *G06F 8/77* | (2018.01) |
| *G06F 16/21* | (2019.01) |
| *G06F 8/658* | (2018.01) |
| *G06F 11/34* | (2006.01) |
| *G06F 8/70* | (2018.01) |
| *G06F 8/656* | (2018.01) |
| *G06F 8/65* | (2018.01) |

(52) U.S. Cl.
CPC ...... *G06F 16/90344* (2019.01); *G06F 40/284* (2020.01); *G06F 8/65* (2013.01); *G06F 8/656* (2018.02); *G06F 8/658* (2018.02); *G06F 8/70* (2013.01); *G06F 11/3476* (2013.01); *G06F 11/36* (2013.01); *G06F 11/366* (2013.01); *G06F 11/3624* (2013.01); *G06F 11/3664* (2013.01); *G06F 11/3688* (2013.01); *G06F 16/21* (2019.01)

(58) Field of Classification Search
CPC .... G06F 8/658; G06F 16/90344; G06F 16/21; G06F 11/3616; G06F 11/008; G06F 11/366; G06F 11/36; G06F 11/3688; G06F 11/3624; G06F 11/3664; G06F 11/3476; G06F 11/362; G06F 9/44547; G06F 9/451
See application file for complete search history.

(56) References Cited

U.S. PATENT DOCUMENTS

| | | | |
|---|---|---|---|
| 8,813,040 B2 | 8/2014 | Holler et al. | |
| 8,875,120 B2 | 10/2014 | Venkatesan et al. | |
| 9,038,053 B2 | 5/2015 | Banavalikar et al. | |
| 9,733,921 B1 | 8/2017 | Saenz et al. | |
| 10,324,830 B2 * | 6/2019 | Holbrook | G06F 8/61 |
| 10,560,520 B2 * | 2/2020 | Wang | H04L 67/02 |
| 2004/0031027 A1 * | 2/2004 | Hiltgen | G06F 8/65 |
| | | | 717/170 |
| 2009/0083268 A1 * | 3/2009 | Coqueret | G06F 8/71 |
| 2010/0131939 A1 | 5/2010 | Hieb et al. | |
| 2010/0174672 A1 * | 7/2010 | Caldwell | G06N 5/022 |
| | | | 706/47 |
| 2014/0053146 A1 | 2/2014 | Freiter et al. | |
| 2014/0373001 A1 | 12/2014 | Wang | |
| 2017/0339221 A1 * | 11/2017 | Wang | H04L 67/1014 |
| 2019/0138431 A1 * | 5/2019 | Holbrook | G06F 8/65 |

OTHER PUBLICATIONS

Extended European Search Report received for EP Patent Application No. 19176184.0, dated Nov. 25, 2019, 7 pages.
Atlassian Products "Atlassian Server Bug Fix Policy" available online at <https://confluence.atlassian.com/support/atlassian-server-bug-fix-policy-201294573.html>, Nov. 13, 2019, 4 pages.
Azure DevOps Server, "Bug Status Report", available online at <https://docs.microsoft.com/en-us/azure/devops/report/sql-reports/bug-status-report?view=tfs-2018>, Microsoft, Oct. 17, 2017, 7 pages.
Cisco Systems, Inc., Cisco Prime Network Release Notes, 4.3.2, available online at <https://www.cisco.eom/c/en/us/td/docs/net_mgmt/prime/network/4-3-2/release/notes/CiscoPrimeNetwork~4-3-2ReleaseNotes.html>, Jul. 31, 2017, 8 pages.
Talend, "Talend Support Services Policy", available online at <https://web.archive.org/web/20190328103310/https://www.talend.com/legal-terms/us-support-policy/>, Mar. 28, 2019, 8 pages.
Zoho Corporation, "Ship great software with automated bugtracking", available online at <https://web.archive.org/web/20191029021037/https://www.zoho.com/bugtracker/>, BugTracker, Oct. 29, 2019, 8 pages.

* cited by examiner

FEATURE-BASED REPORTING OF SOFTWARE VERSIONS

BACKGROUND

Life cycle of a software includes various stages from development of the software to initial release followed by upgrades to fix defects in the software or provide enhanced features. A feature may refer to a functionality provided by the software. While a software may include multiple features, when installing and configuring the software on a computing device, a user may configure some of the features and may choose to not configure other features of the software on that computing device. In case of a network of computing devices, the installation, configuration, and upgrading of software on each of the computing devices may be performed centrally, for example, through a network management system.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
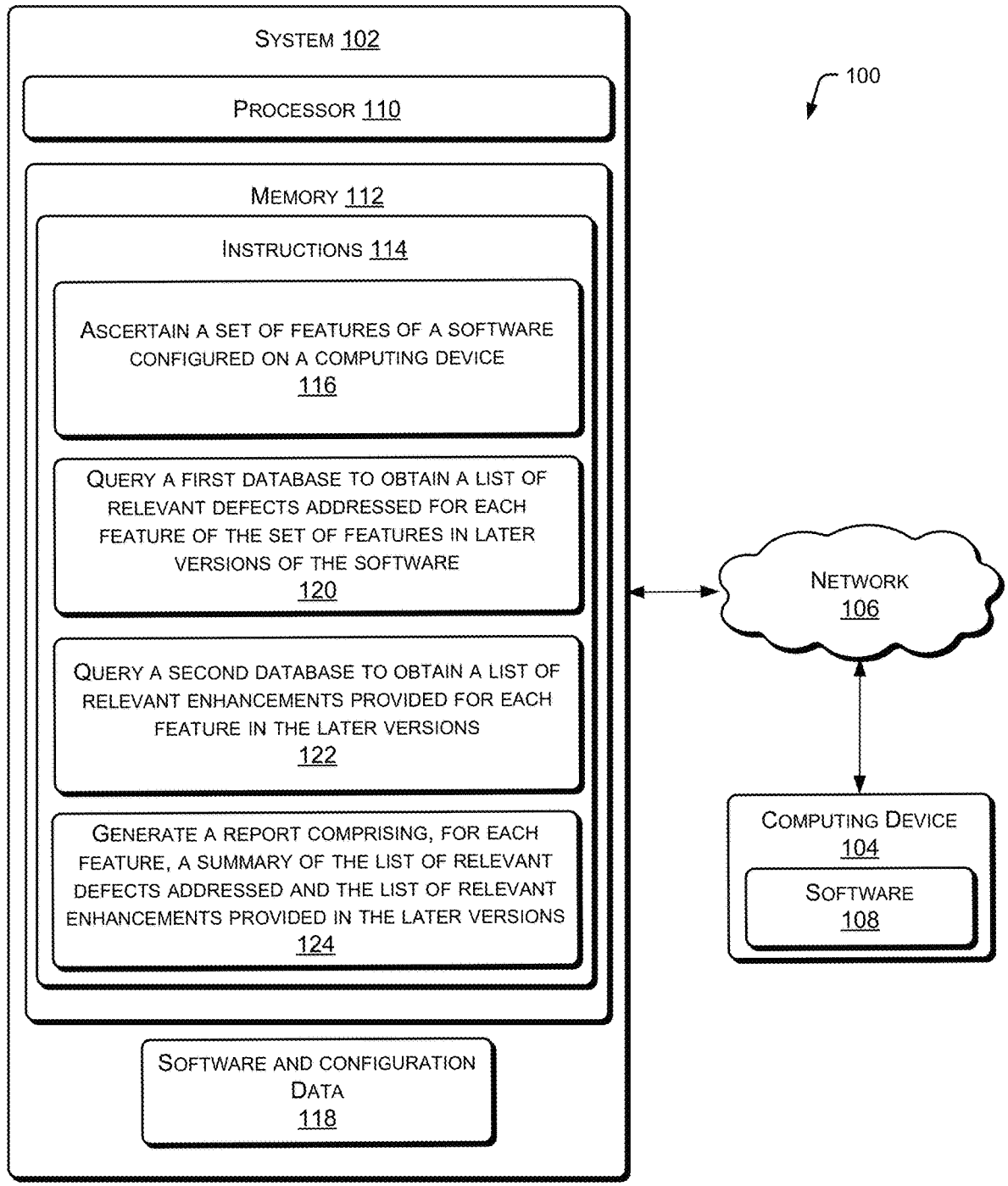
FIG. 1 illustrates an example network environment for feature-based reporting of software versions, in accordance with an example of the present subject matter.

Various versions of a software may be released at different points in time during its life cycle to provide enhanced features and fix defects. For ease of discussion, the release of a new version of a software is also referred to as a software release. For example, a software release may be provided in response to users of the software reporting issues to be fixed or asking for new or additional functionalities as enhanced features, also be referred to as enhancements. In addition, the developer of the software may also find and fix defects or provide enhancements from time to time in various software releases. However, once a software is installed on a computing device, users typically do not upgrade the software often and hence fail to benefit from the defect fixes and enhancements provided in the newer versions of the software.

Moreover, when a software is installed and configured on a computing device, the user may configure some of its features and choose to not configure other features. As a result, not all the newer versions of the software may be relevant for upgrading the software on the computing device. While there are well-documented release notes available for every software release, the user may have to go through the detailed documentation to understand the defect fixes and enhancements provided in a release, determine whether the release is relevant for the configuration being used by the user, and decide whether to upgrade the software to benefit from the release. As this can be a cumbersome and a non-trivial task, the user may not upgrade the software due to which the computing device may be at risk due to defects not having been fixed.

In case of a network of computing devices, a user may configure the computing devices at the time of deployment in the network and may not be proactive in updating the software or referring to the release notes of later versions to become aware of subsequently fixed defects. The computing devices in the network may include various network nodes, such as routers, switches, access points, laptops, servers, databases, and the like. The unaddressed defects in the software of a computing device may disrupt the operation of the whole network.

Various aspects of the present subject matter provide for feature-based reporting of software versions. In one example, a set of features of a software may be ascertained for generation of a feature-based report. A first database may be queried, based on a current version of the software installed on the computing device and the set of features, to obtain a list of relevant defects addressed for each feature of the set of features in later versions of the software. A second database may be queried, based on the current version of the software installed on the computing device and the set of features, to obtain a list of relevant enhancements provided for each feature of the set of features in the later versions. A report may be generated based on responses received from the first and second database and may be provided to the user. The report comprises, for each feature, a summary of the list of relevant defects addressed in the later versions and the list of relevant enhancements provided in the later versions.

The report thus generated is a feature-based report indicating, for each feature, the list of relevant defects addressed in later versions. Such a report helps the user to easily identify the later versions of the software that are relevant to the configuration of the software used on the computing device. The report can also inform the users of relevant enhancements provided in the later versions for each feature of the set of features. In one example, the feature-based report may also include, for each feature, a list of planned defect fixes and enhancements in planned versions that are to-be released.

Hence, the various aspects of the present subject matter allow the user to easily make decisions regarding upgrading the software to benefit from the various software releases and help avoid disruptions in operation of the computing device and the network in which the computing device is deployed.

The above systems and methods are further described in conjunction with appended figures. It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and examples of the present subject matter, as well as specific examples thereof, are intended to encompass equivalents thereof.

In the figures, the left-most digit(s) of a reference number identifies the figure in which the reference number first appears. The same numbers are used throughout the figures to reference like features and components.

FIG. 1 illustrates an example network environment 100 for feature-based reporting of software versions, in accordance with an example of the present subject matter. The network environment 100 includes a system 102 communicatively connected to a computing device 104 through a network 106. The system 102 can be implemented in any computing system, such as a desktop, a laptop, a server, a distributed computing system, and the like. The computing device 104 can be any device capable of being managed by the system 102. For example, the computing device 104 may be a router, a switch, an access point, a gateway, a laptop, a server, a database, and the like. For managing the computing device 104, in one example, the system 102 may implement a Network Management System (NMS) using various NMS protocols, such as Simple Network Management Protocol (SNMP).

The network 106 may be a private network or a public network and may be implemented as a wired network, a wireless network, or a combination of a wired and wireless network. The network 106 can also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

In one example implementation, the system 102 may be deployed in a cloud environment while the computing device 104 may be deployed in a Local Area Network (LAN) or Wide Area Network (WAN) environment and may be accessed and managed by the system 102 over the network 106. Management of the computing device 104 includes managing the software configured on the computing device 104.

In one example, the computing device 104 may include a software 108 configured thereon. The software 108 may be, for example, embedded software or firmware or an application. The software 108 may provide multiple functionalities, also referred to as features, for operation of the computing device 104. To allow the features to be used, initially, the software 108 may be configured on the computing device 104 either directly using a command line interface (CLI) of the computing device 104 or through the system 102. The version of the software 108 configured on the computing device 104 may be referred to as a current version. At the time of configuring the current version of the software 108, a user, such as an administrator of a network in which the computing device 104 is deployed, may choose to configure some of the features and not configure the others.

Subsequently, a provider of the software 108 may release newer versions of the software 108, also referred to as later versions, to fix defects in some features or provide enhancements to some features. A defect or a bug in a software refers to a fault in a feature of the software due to which the software does not work as expected and gives incorrect results. The defect may have been identified and reported by customers who use the software or by the provider of the software. A fix refers to a change made in the software to correct the fault so that the software works as expected. Sometimes, for example, in case it is expected to take a long time to fix the defect, the software provider may provide a temporary resolution, called a workaround, until such time as the defect can be fixed.

The software provider may also provide detailed release notes with each later version identifying the defects fixed, the temporary resolutions provided, and the enhancements provided in that later version. However, not all the later versions may be relevant for upgrading the software 108 on the computing device 104 as not all the features may be configured on the computing device 104.

To help the user identify which later version is relevant for upgrading the software 108, the system 102 may generate and provide a feature-based report, also referred to as report, to the user. The report may be provided to the computing device 104 or to a different computing device, called a user device, that is connected to the network 106. The report may be displayed over a Graphical User Interface (GUI) of the computing device 104 or the user device or may be provided as a file or document.

In one implementation, the system 102 includes a processor 110 and a memory 112 coupled to the processor 110. In addition, the system 102 may include other components, such as interfaces to communicate over the network 106 or with external storage or computing devices, display, input/output interfaces, operating systems, applications, data, and the like, which have not been described for brevity.

The processor 110 may be implemented as a dedicated processor, a shared processor, or a plurality of individual processors, some of which may be shared. The memory 112 may be communicatively connected to the processor 110. Among other capabilities, the processor 110 may fetch and execute computer-readable instructions, including instructions 114, stored in the memory 112. The memory 112 may include any non-transitory computer-readable medium including, for example, volatile memory such as RAM, or non-volatile memory such as EPROM, flash memory, and the like.

In one implementation, the processor 110 may fetch and execute instructions 114 to generate and provide the feature-based report including a summary of the defects fixed and enhancements provided for one or more features of the software 108 configured on the computing device 104.

The instructions 114 may include instructions 116 to ascertain a set of features of the software 108 for which the report is to be generated. In one example, the set of features may be ascertained from software and configuration data 118 stored in the memory 112. For example, the software and configuration data 118 may include information regarding the current versions of software and their features configured on computing devices managed by the system 102, including the computing device 104. Such information may be received and stored by the system 102 as a part of the NMS implementation.

In another example, the set of features may be ascertained from the computing device 104. For example, the processor 110 may send a query to the computing device 104 asking for configuration information and may ascertain the set of features from the configuration information received in response to the query. In yet another example, the set of features and/or the configuration information may be provided by a user to the system 102 as part of a request for generating the feature-based report. For example, the user may request for the report to be generated for all features provided by the software 108 irrespective of whether the feature is configured on the computing device 104. Hence, the set of features ascertained by the instructions 116 may include some or all of the features available in the software 108.

Further, the instructions 114 may include instructions 120 to query a first database, based on the set of features and the current version of the software 108 configured on the computing device 104, to obtain a list of relevant defects and details of relevant defects addressed in later versions. The list of relevant defects includes, for each feature of the set of features, defects that were reported for the current version and defects reported for previous versions but not fixed in the current version. Relevant defect addressed in a later version refers to the defect, from among the list of relevant defects, that was fixed or temporarily resolved in the later version. In one example, the later version may be a planned version that is to-be released and the relevant defect addressed may be a defect for which a fix is planned to be provided in the planned version.

In one example, the first database is a defects database that is used to track each defect for the software 108 and includes information about when and for which version a defect was reported and in which version the defect was fixed or temporarily resolved or planned to be fixed. Thus, by querying the defects database based on the set of features and the current version of the software 108, the system 102 can receive the list of relevant defects and details of relevant defects addressed in later versions.

Further, the instructions 114 may include instructions 122 to query a second database, based on a current version of the software configured on the computing device and the set of features, to obtain a list of later versions available for the software and relevant enhancements provided in each later version. Relevant enhancements provided in a later version refers to enhancements provided for one or more features in the set of features in the later version.

The second database may be, for example, a software release database that records release information about the different versions of the software released by the software provider. The release information can include information about the release date, defects fixed, temporary resolutions provided, and the enhancements provided in each version.

The instructions 114 can further include instructions 124 to generate a feature-based report based on the response received from the first database and the second database. In one example, the list of later versions, the list of relevant defects addressed, and the list of relevant enhancements provided for each feature in each later version may be summarized in the report.

The instructions 114 can further include instructions to provide the report to a user. In one example, the report may be provided in a tabular format indicating, for each feature, the relevant defects addressed and the enhancements provided in each of the later versions. In one example, the report can be provided to a GUI of the computing device 104 or a user device and the user can select a particular feature for which the report is to be displayed.

Accordingly, the user may be easily able to identify which later versions may be useful for upgrading the software 108. The user may also be able to take a decision on whether to upgrade the software 108 and to which later version without having to go through detailed release notes. Hence, the user may be able to upgrade the software 108 in a timely manner, which will help in improving the reliability of operations of the computing device 104.

An example scenario for implementation of feature-based reporting of software versions will be further explained with reference to FIG. 2.

Figure 2:
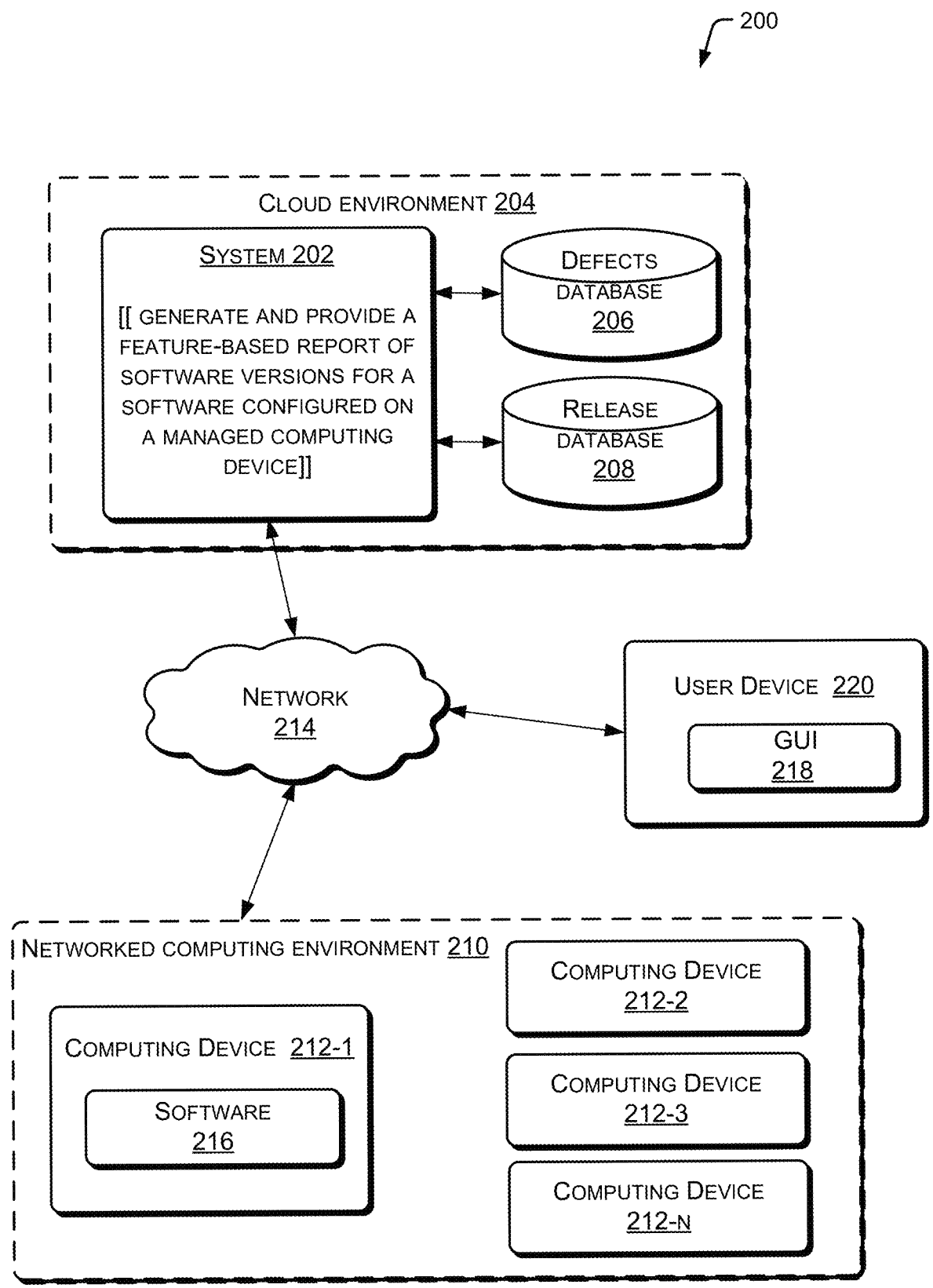
FIG. 2 illustrates an example network environment for feature-based reporting of software versions, in accordance with an example of the present subject matter.

FIG. 2 illustrates an example network environment 200 for feature-based reporting of software versions, in accordance with an example of the present subject matter.

The network environment 200 includes a system 202 implemented in a cloud environment 204 for feature-based reporting of software versions for managed computing devices. The system 202 may be an implementation of the system 102 discussed above. The cloud environment 204 also includes a defects database 206 and a release database 208. As discussed above, the defects database 206 includes information about defects reported and addressed in different versions of a software and the release database 208 includes information about the enhancements provided in the different versions.

The network environment 200 further includes a networked computing environment 210, also referred to as computing environment 210, that includes computing devices 212-1, 212-2, 212-3 . . . 212-n. The computing devices 212-1, 212-2, 212-3 . . . 212-n may be collectively referred to as computing devices 212. The computing devices 212 may be part of a network, such as a LAN or a WAN. The computing devices 212 may be managed by the system 202, for example, using NMS and SNMP, over the network 214. The network 214 may be an implementation of the network 106 discussed above.

Further, each of the computing devices 212 may be an implementation of the computing device 104 discussed above. For example, computing device 212-1 may be a switch and may include software 216, such as a firmware or embedded software, which may be monitored by the system 202. Further, the computing device 212-2 may be an access point managed by the system 202 and the computing device 212-3 may be a gateway managed by the system 202. Similarly, the computing device 212-n may be any networked computing device managed by the system 202. It will be understood that each of the computing devices 212 will include respective software component that is managed by the system 202.

The system 202 can generate and provide feature-based reports of software versions for the software configured on the managed computing devices 212. In one example, the system 202 provides the feature-based reports over a GUI, such as GUI 218, of a user device 220. The user device 220 may be a device, such as a desktop, laptop, mobile device, or the like used by a user, such as an administrator of the computing environment 210, for managing the computing devices 212 through the system 202. In one example, the GUI 218 may be a web-based interface that is provided by the system 202 for managing the computing devices 212. While the user device 220 is shown as being outside the computing environment 210, it will be understood that in different implementations, the user device 220 may be within the computing environment 210 also.

In operation, a user may access the web-based GUI 218 of the system 202 on the user device 220 and may select a computing device, such as computing device 212-1, which may be a switch, for viewing a feature-based report for the software 216. The computing device 212-1 is also referred to as switch 212-1 hereinafter for discussion purposes. The system 202 may determine the current version of the software 216 and ascertain the set of features of the software 216 for which the report is to be generated.

In one example, the system 202 may store information about the current version and features configured of the software 216 and may generate the feature-based report based on the stored information. In another example, the system 202 may send a query to the switch 212-1 to determine the current version and ascertain the features configured to generate the feature-based report. In yet another example, the user may specify the set of features for which the report is to be generated, for example, by selecting the set of features from a drop-down menu listing all features provided by the software 216, whether configured or not on the switch 212-1. The set of features selected by the user may include some or all of the features provided by the software 216 or may include a single feature of interest to the user.

In one example, when the system 202 receives configuration information from the switch 212-1 in response to a query, the system 202 may analyze the configuration information to ascertain the set of features for generating the report. For example, each line in the configuration information may be taken one at a time and broken into keywords. Each keyword may be associated with a weight based on the position of the keyword in the line. For example, a keyword that refers to a main feature/functionality may be given a first weight that is higher than a second weight given to keywords that refer to a sub-feature, while keywords that refer to values or data may be given null weight. The keywords having null weight may be ignored and the remaining keywords may be combined to form the set of features. The set of features thus obtained may be used for querying the defects database 206 and the release database 208.

For example, for switch 212-1, the following configuration information may be received by the system 202.
   router bgp 64321
   bgp router-id 10.34.0.70
   bgp log-neighbor-changes
   redistribute connected
   neighbor 10.34.0.69 remote-as 64123
   neighbor 10.34.0.69 update-source loopback 0

Here in the first line, the configuration information can be broken down into to three keywords—'router' 'BGP' '64321'. The keyword 'BGP' would be assigned the highest weight since it refers to Border Gateway Protocol, which is a protocol for managing packets routed between different networks and corresponds to a functionality or main feature. The keyword 'router' would be given a lower weight as it refers to a component. The keyword '64321' is a value and hence will be given a null weight and will be ignored as it is an identifier and does not provide additional information about the configuration.

The second line of the configuration information does not provide any additional information over the first line as the keywords 'BGP' and 'router' have already been considered in the first line the remaining is a value that is to be given null weight and ignored. Next four lines in the configuration information are in the context of the feature 'BGP', i.e., they provide specific configuration information for the BGP router. From the next four lines, the sub-features 'redistribute', 'neighbor remote', neighbor loopback', and 'log neighbor' can be identified and may be given a lower weight than BGP. The keywords can be then combined based on the weight to obtain the set of features, such as "BGP redistribute", "BGP neighbor remote", "BGP neighbor loopback" and "BGP log neighbor".

On determining the current version and ascertaining the set of features, the system 202 may generate the feature-based report to indicate, for each feature in the set of features, a list of relevant enhancements provided and a list of relevant defects addressed in each later version available of the software. As discussed, relevant defects include, for each feature of the set of features, defects reported for the current version and non-fixed defects from previous versions. Relevant defects addressed refer to the relevant defects that have been fixed or temporarily resolved in the later versions. Further, relevant enhancements include enhancements provided for each feature of the set of features in the later versions.

The system 202 may then provide the feature-based report to the GUI 218 for viewing by the user. In one implementation, the feature-based report may be in a tabular format and may be grouped by feature for ease of reference of the user. In one example, the user may filter the feature-based report to view the report for one feature at a time.

In one example, in the tabular format, for a feature, the list of relevant defects and relevant enhancements may be provided in a first column, while the list of the later versions may be provided in the first row. In the remaining cells, an indication may be given whether the corresponding defect fix or enhancement is present in the corresponding later version. For example, a defect that is fixed in a later version may be shown as a tick mark, if the defect is not fixed but temporary resolution or work around is provided, it may be shown as "W.A" and for the non-fixed defects it may be shown as a cross mark. In other examples, color coding may be used additionally or alternatively to the marks. Similarly, for the enhancements of each feature, the tabular summary may indicate in which later versions the enhancements are present. In one example, the later versions shown in the tabular format may include planned versions that are to-be released and accordingly the tabular summary may indicate, for each feature, which defect fixes and enhancements are planned to be provided in the planned release.

Thus, the user can compare the various versions for each feature and can decide whether it is the right time and right version for upgrading the software 216. In one example, based on the report, the user may select a later version of the software for upgrading the software and accordingly, the later version may be provided to the computing device for upgrading the software to the selected later version.

Figure 3:
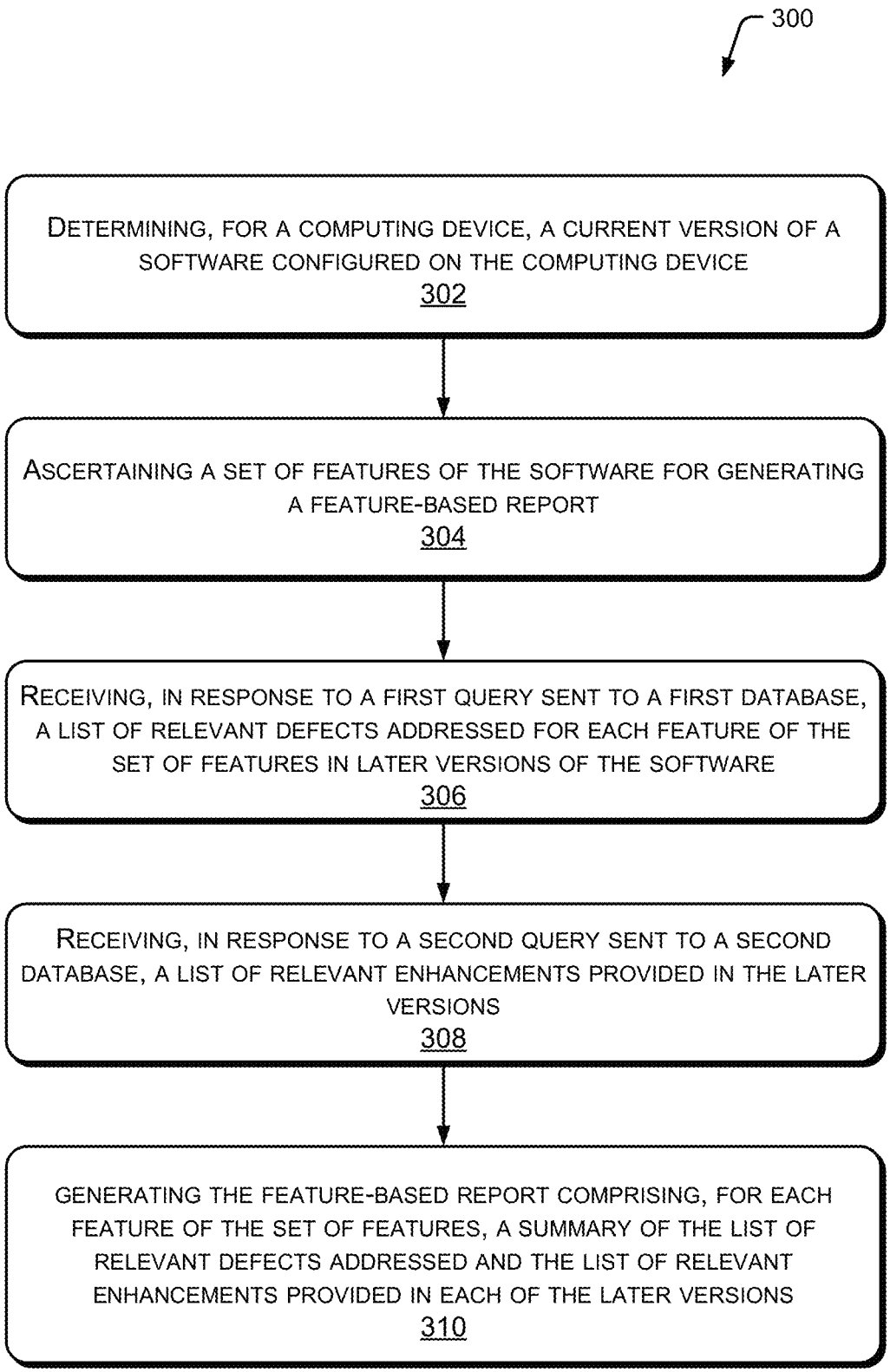
FIG. 3 illustrates an example method for feature-based reporting of software versions, in accordance with an example of the present subject matter.
Figure 4:
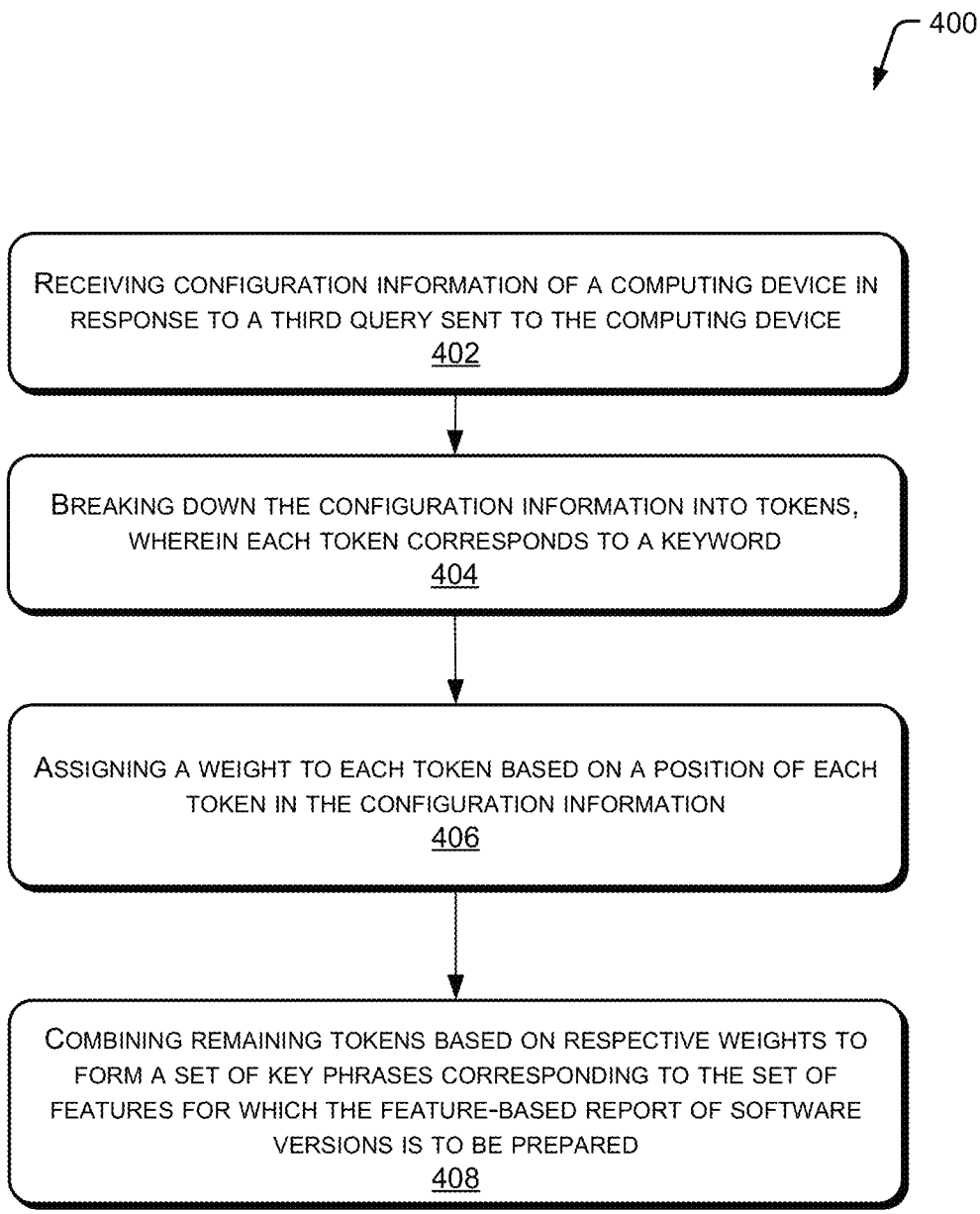
FIG. 4 illustrates an example method for ascertaining features configured on a computing device for feature-based reporting of software versions, in accordance with an example of the present subject matter.

FIGS. 3 and 4 illustrate example methods 300 and 400 for feature-based reporting of software versions, in accordance with example implementations of the present subject matter. The order in which the methods 300 and 400 are described is not intended to be construed as a limitation, and some of the described method blocks can be combined in a different order to implement the methods, or alternative methods.

Furthermore, the methods 300 and 400 may be implemented in any suitable hardware, computer-readable instructions, or combination thereof. The steps of the methods 300 and 400 may be performed by either a system under the instruction of machine executable instructions stored on a non-transitory computer readable medium or by dedicated hardware circuits, microcontrollers, or logic circuits. For example, the methods 300 and 400 may be performed by the system 102 or 202 in the network environment 100 or 200. Herein, some examples are also intended to cover non-transitory computer readable medium, for example, digital data storage media, which are computer readable and encode computer-executable instructions, where said instructions perform some or all of the steps of the methods 300 and 400.

With reference to FIG. 3 and method 300, at block 302, for a computing device, a current version of a software configured on the computing device is determined.

At block 304, a set of features of the software is ascertained for generating a feature-based report of software versions. In one example, the set of features may be received from a user. In another example, the set of features may be determined from analysis of configuration information received from the computing device.

At block 306, in response to a first query sent to a first database, a list of relevant defects addressed for each feature of the set of features in later versions of the software is received. The first database may be, for example, a defects database. Relevant defects include, for each feature, defects reported for the current version and non-fixed defects from previous versions. The list of relevant defects addressed may include, for example, relevant defects fixed and relevant defects provided with temporary resolutions in later versions. Further, the list of later versions may include a planned release version and the list of relevant defects addressed includes defects targeted to be fixed in the planned release version.

At block 308, in response to second query sent to a second database, a list of relevant enhancements provided for the software in the later versions is received. In one example, the second database may be a release database.

At block 310, the feature-based report is generated. The report comprises, for each feature of the set of features, a summary of the list of relevant defects addressed in the later versions, and the list of relevant enhancements provided in the later versions.

Further, based on the report, the user may select a later version of the software for upgrading the software and accordingly, the software on the computing device may be upgraded to the selected later version.

With reference to FIG. 4 and method 400, at block 402, configuration information of the computing device is received in response to a third query sent to the computing device. For example, to ascertain the set of features for which the report is to be generated, the third query may be sent to the computing device to obtain configuration information.

At block 404, the configuration information is broken down into tokens, wherein each token corresponds to a keyword.

At block 406, a weight is assigned to each token based on a position of each token in the configuration information, wherein tokens corresponding to values are assigned a null weight, tokens corresponding to features are assigned a first weight, and tokens corresponding to sub-features are assigned a second weight less than the first weight. Further, tokens with null weight are eliminated.

At block 408, remaining tokens are combined based on respective weights to form a set of key phrases. The set of key phrases thus determined corresponds to the set of features for which the feature-based report of software versions is to be generated.

Based on the set of key phrases, the first query and second query can be generated for being sent to the first database and the second database respectively. Based on the response received for the first and second queries, the list of relevant defects addressed and the list of relevant enhancements provided in later versions may be determined for each feature in the set of features as discussed earlier.

Figure 5:
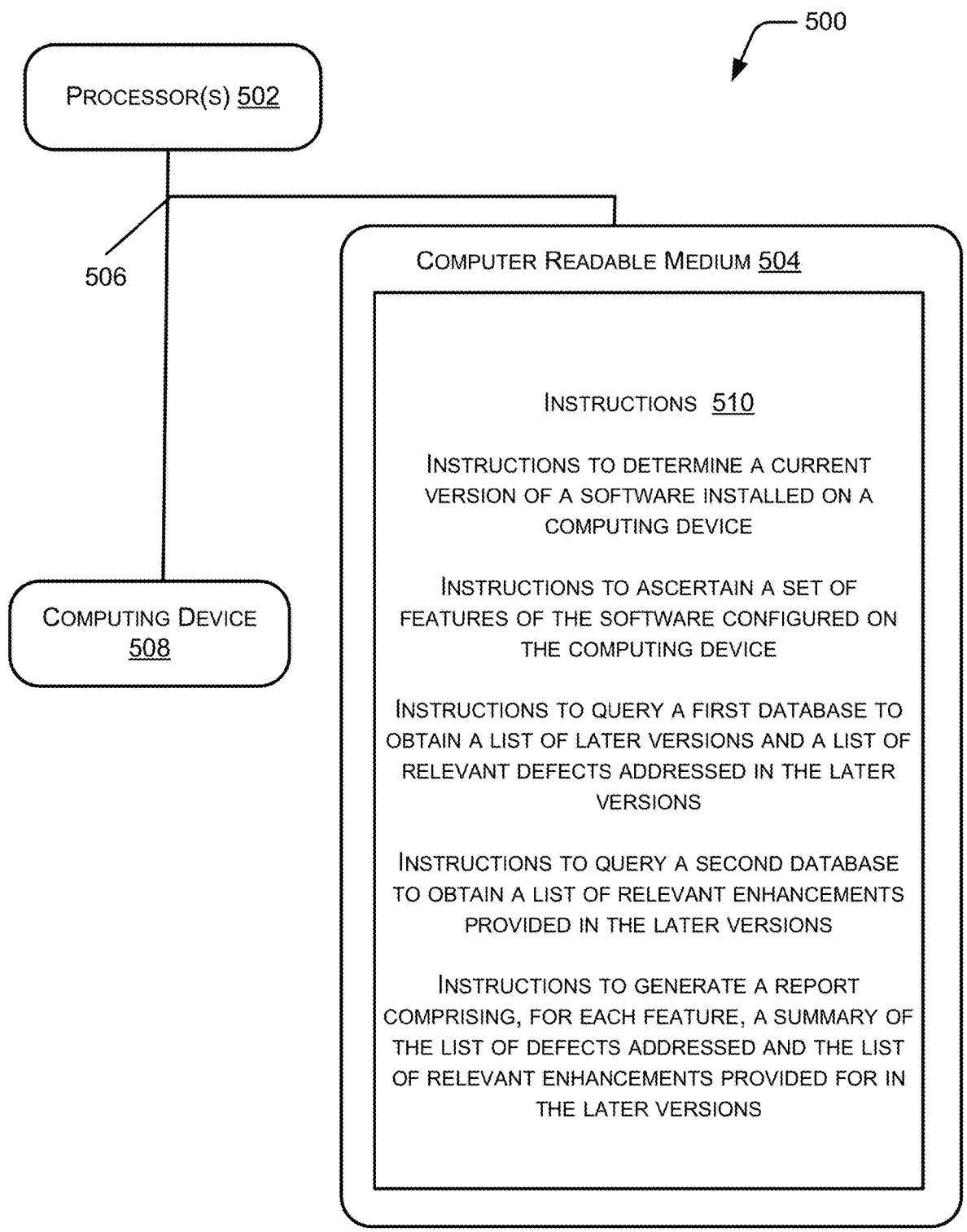
FIG. 5 illustrates a computing environment implementing a non-transitory computer readable medium for feature-based reporting of software versions, according to an example of the present subject matter.

FIG. 5 illustrates a computing environment 500 implementing a non-transitory computer readable medium for feature-based reporting of software versions, according to an example.

In an example, the computing environment 500 includes processor(s) 502 communicatively coupled to a non-transitory computer readable medium 504 through a communication link 506. In an example implementation, the computing environment 500 may be for example, the network environment 100 or 200. In an example, the processor(s) 502 may have one or more processing resources for fetching and executing computer-readable instructions from the non-transitory computer readable medium 504. The processor(s) 502 and the non-transitory computer readable medium 504 may be implemented, for example, in system 102 or system 202.

The non-transitory computer readable medium 504 can be, for example, an internal memory device or an external memory device. In an example implementation, the communication link 506 may be a network communication link, such as of network 106 or network 214.

The processor(s) 502 and the non-transitory computer readable medium 504 may also be communicatively coupled to a computing device 508 over the network. The computing device 508 may be implemented, for example, as computing device 104 or any of the computing devices 212.

In an example implementation, the non-transitory computer readable medium 504 includes a set of computer readable instructions which can be accessed by the processor(s) 502 through the communication link 506 and subsequently executed to perform acts for feature-based reporting of software versions.

Referring to FIG. 5, in an example, the non-transitory computer readable medium 504 includes instructions 510 that cause the processor(s) 502 to generate a feature-based report of software versions available for a software installed on a computing device 508 and provide the report to a user.

For this, a current version of a software installed on the computing device 508 may be determined. A set of features of the software configured on the computing device may be ascertained. A first database may be queried based on the current version of the software installed on the computing device and the set of features configured on the computing device, to obtain a list of later versions available for the software and a list of relevant defects addressed for each feature of the set of features in each of the later versions. A second database may be queried based on the set of features and the current version of the software, to obtain a list of relevant enhancements provided for each feature in the later versions. Accordingly, the feature-based report may be generated. The report comprises a summary of the list of relevant defects addressed, and the list of relevant enhancements provided for each feature in the later versions.

In one example, the list of later versions includes a planned release version, and the list of relevant defects addressed includes, for each later version, relevant defects fixed, relevant defects with temporary resolutions, and relevant defects targeted to be fixed in the planned release version. The user may utilize the feature-based report thus generated for deciding whether to upgrade the software and which later version is to be used for upgrading the software.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

We claim:
1. A method comprising:
   determining, by a network management system, a current version of a software configured on a computing device;
   obtaining configuration information of the computing device in response to a query sent to the computing device;

analyzing the configuration information to determine a set of features of the software for generating a feature-based report of software versions;

determining key phrases for generating a first query and a second query by:

breaking down the configuration information into tokens corresponding to respective keywords of the configuration information, assigning a weight to each token of the tokens based on a position of a corresponding keyword in the configuration information, wherein tokens corresponding to keywords referring to values are assigned a null weight, tokens corresponding to keywords referring to features are assigned a first weight, and tokens corresponding to keywords referring to sub-features are assigned a second weight, eliminating tokens with null weight, and combining remaining tokens based on respective weights to form the key phrases;

generating a first query and a second query using the key phrases;

receiving, in response to a first query sent to a first database, a list of relevant defects addressed for each feature of the set of features in later versions of the software, wherein relevant defects include defects reported for the current version and non-fixed defects from previous versions for each feature;

receiving, in response to second query sent a second database, a list of relevant enhancements provided in the later versions, wherein relevant enhancements include enhancements provided for each feature of the set of features in the later versions; and generating the feature-based report, wherein the report comprises, for each feature of the set of features, a summary of the later versions, the list of relevant defects addressed, and the list of relevant enhancements provided in each of the later versions.

2. The method of claim 1, wherein the list of relevant defects addressed includes relevant defects fixed and relevant defects provided with temporary resolutions.

3. The method of claim 1, wherein the later versions include a planned release version and the list of relevant defects addressed includes defects targeted to be fixed in the planned release version.

4. The method of claim 1, wherein the computing device is a network node.

5. The method as claimed in claim 1, wherein the method comprises receiving, from a user, a selection of a later version of the software from among the list of later versions; and providing the later version selected by the user to the computing device for upgrading the software.

6. The method of claim 1, wherein the computing device is a network node selected from a switch, a gateway, and an access point.

7. A system comprising:

a processor; and a memory coupled to the processor, wherein the processor is to fetch and execute instructions from the memory to:

query the computing device to obtain configuration information;

analyze the configuration information to determine a set of features of a software on a computing device;

break down the configuration information into tokens corresponding to respective keywords of the configuration information;

assign a weight to each token of the tokens based on a position of a corresponding keyword in the configuration information, wherein tokens corresponding to keywords referring to values are assigned a null weight, tokens corresponding to keywords referring to features are assigned a first weight, and tokens corresponding to keywords referring to sub-features are assigned a second weight;

eliminate tokens with null weight;

combine remaining tokens based on respective weights to form the key phrases that correspond to the set of features;

query a first database, based on the key phrases and a current version of the software installed on the computing device, to obtain a list of relevant defects addressed for each feature of the set of features in each later version;

query a second database, based on the current version of the software and the key phrases, to obtain a list of relevant enhancements provided for each feature of the set of features in the later versions; and generate a report based on responses received from the first and second database to a user, wherein the report comprises, for each feature of the set of features, a summary of the list of relevant defects addressed and the list of relevant enhancements provided in each of the later versions.

8. The system of claim 7, wherein the list of relevant defects addressed includes relevant defects fixed and relevant defects with temporary resolutions.

9. The system of claim 7, wherein the list of later versions includes a planned release version and the list of relevant defects includes defects targeted to be fixed in the planned release version.

10. The system of claim 7, wherein, to generate the report, the processor is to generate a tabulated summary for each feature, the tabulated summary comprising the list of relevant defects addressed and the list of relevant enhancements provided in each later version for the feature.

11. The system of claim 7, wherein, to generate the report, the processor is to:

receive, from the user, a selection of a feature from among the set of features; and provide the list of relevant defects addressed and the list of relevant enhancements provided in each later version for the feature selected by the user.

12. The system of claim 7, wherein the computing device is a network node selected from a switch, a gateway, and an access point.

13. A non-transitory computer-readable medium comprising computer-readable instructions for feature-based software version upgrade reporting, the computer-readable instructions when executed by a processor cause the processor to:

determine, for a computing device, a current version of a software installed on the computing device;

query the computing device to obtain configuration information;

analyze the configuration information to determine a set of features of the software on the computing device;

break down the configuration information into tokens corresponding to respective keywords of the configuration information;

assign a weight to each token of the tokens based on a position of a corresponding keyword in the configuration information, wherein tokens corresponding to keywords referring to values are assigned a null weight, tokens corresponding to keywords referring to features are assigned a first weight, and tokens corresponding to keywords referring to sub-features are assigned a second weight;

eliminate tokens with null weight;

combine remaining tokens based on respective weights to form the key phrases that correspond to the set of features;

query a first database, based on the current version of the software installed on the computing device and the set of features, to obtain a list of later versions available for the software and a list of relevant defects addressed for each feature of the set of features in each of the later versions;

query a second database, based on the set of features configured on the computing device and the list of later versions available for the software, to obtain a list of relevant enhancements provided for each feature; and generate a report, wherein the report comprises a summary of the list of relevant defects addressed and the list of relevant enhancements provided for each feature in the later versions, wherein the list of later versions includes a planned release version, and wherein the list of relevant defects addressed includes, for each later version, relevant defects fixed, relevant defects with temporary resolutions, and relevant defects targeted to be fixed in the planned release version.

14. The non-transitory computer-readable medium of claim 13, further comprising computer-readable instructions that when executed by a processor cause the processor to generate the report as a tabulated summary, the tabulated summary comprising the list of relevant defects addressed and the list of relevant enhancements provided in each later version for the feature; and provide the report to a user on a graphical user interface.

15. The non-transitory computer-readable medium of claim 13, wherein the computing device is a network node selected from a switch, a gateway, and an access point.

* * * * *